US010574369B2

(12) United States Patent
Jing et al.

(10) Patent No.: US 10,574,369 B2
(45) Date of Patent: Feb. 25, 2020

(54) SYSTEMS AND METHODS FOR CALIBRATING OUT THE RADIATION CHANNEL MATRIX IN A MULTIPLE INPUT, MULTIPLE OUTPUT (MIMO) OVER-THE-AIR (OTA) RADIATED TEST SYSTEM

(71) Applicant: Keysight Technologies, Inc., Santa Rosa, CA (US)

(72) Inventors: Ya Jing, Beijing (CN); Hong-Wei Kong, Beijing (CN)

(73) Assignee: Keysight Technologies, Inc., Santa Rosa, CA (US)

( * ) Notice: Subject to any disclaimer, the term of this patent is extended or adjusted under 35 U.S.C. 154(b) by 64 days.

(21) Appl. No.: 15/629,211

(22) Filed: Jun. 21, 2017

(65) Prior Publication Data

US 2017/0373773 A1    Dec. 28, 2017

(30) Foreign Application Priority Data

Jun. 23, 2016    (CN) .......................... 2016 1 0463177

(51) Int. Cl.
*H04B 17/318* (2015.01)
*H04B 7/0413* (2017.01)
*H04W 24/08* (2009.01)

(52) U.S. Cl.
CPC ......... *H04B 17/318* (2015.01); *H04B 7/0413* (2013.01); *H04W 24/08* (2013.01)

(58) Field of Classification Search
CPC .... H04B 17/318; H04B 7/0413; H04W 24/08
See application file for complete search history.

(56) References Cited

U.S. PATENT DOCUMENTS 6,400,318 B1 * 6/2002 Kasami ............... H01Q 3/2605
                                                    342/372
8,811,461 B1    8/2014 Huynh
(Continued)

FOREIGN PATENT DOCUMENTS

WO    2014086268    6/2014

OTHER PUBLICATIONS

Yu, et al., "Radiated Two-Stage Method for LTE MIMO User Equipment Performance Evaluation", IEEE Transactions on Electromagnetic Compatibility vol. 56, No. 6, Dec. 2014, pp. 1691-1696.

(Continued)

*Primary Examiner* — Andrew Lai
*Assistant Examiner* — Chuong M Nguyen

(57) ABSTRACT

A MIMO test system is provided that performs non-cable-conducted, over-the-air radiated calibration and test modes of operations. A DUT is located in an anechoic chamber having a plurality of probe antennas disposed therein. During the calibration mode, the test instrument causes predetermined signals to be transmitted over a transmission channel comprising a non-cable-conducted, OTA interface between probe antennas of the chamber and antenna ports of the DUT and obtains measurements of received power and relative phase. The test instrument uses the measurements to construct a radiation channel matrix associated with the transmission channel and obtains an inverse matrix of the radiation channel matrix. During the test mode, the test system performs a non-cable-conducted, OTA radiated test during which the test instrument applies the inverse matrix to DUT performance measurements obtained by the test instrument to calibrate out the radiation channel matrix from the DUT performance measurements.

20 Claims, 6 Drawing Sheets

(56) References Cited

U.S. PATENT DOCUMENTS

| | | | |
|---|---|---|---|
| 9,188,618 B2 | 11/2015 | Gross | |
| 9,671,445 B2* | 6/2017 | Huynh | G01R 29/10 |
| 9,774,406 B2* | 9/2017 | Huynh | H04B 17/29 |
| 2003/0003883 A1* | 1/2003 | Wallace | H01O 3/26 |
| | | | 455/115.1 |
| 2008/0056340 A1* | 3/2008 | Foegelle | H04B 17/0082 |
| | | | 375/224 |
| 2008/0305754 A1* | 12/2008 | Foegelle | H04W 24/00 |
| | | | 455/115.1 |
| 2011/0299570 A1* | 12/2011 | Reed | H04B 7/0434 |
| | | | 375/130 |
| 2012/0071107 A1* | 3/2012 | Falck | H01O 3/24 |
| | | | 455/67.12 |
| 2012/0207030 A1 | 8/2012 | Luong | |
| 2013/0303089 A1 | 11/2013 | Wang et al. | |
| 2014/0087668 A1 | 3/2014 | Mow et al. | |
| 2014/0122049 A1* | 5/2014 | Kyosti | G01R 29/0821 |
| | | | 703/13 |
| 2014/0323054 A1* | 10/2014 | Aryanfar | H04L 25/0204 |
| | | | 455/63.3 |
| 2015/0025818 A1 | 1/2015 | Das et al. | |
| 2015/0280844 A1 | 10/2015 | Yu et al. | |
| 2015/0331022 A1* | 11/2015 | Bai | G01R 29/10 |
| | | | 702/60 |
| 2016/0226709 A1* | 8/2016 | Chen | G01R 29/105 |
| 2019/0103926 A1* | 4/2019 | Chen | H04W 24/06 |

OTHER PUBLICATIONS

Rumney, et al., "Advances in Antenna Pattern-Based MIMO OTA Test Methods", 2015 9th European Conference onAntennas and Propagation (EuCAP), Lisbon, Portugal, Apr. 13-17, 2015, 5 pages.
Co-pending U.S. Appl. No. 15/054,847, filed Feb. 26, 2016.

\* cited by examiner

SYSTEMS AND METHODS FOR CALIBRATING OUT THE RADIATION CHANNEL MATRIX IN A MULTIPLE INPUT, MULTIPLE OUTPUT (MIMO) OVER-THE-AIR (OTA) RADIATED TEST SYSTEM

CROSS REFERENCE TO RELATED APPLICATIONS

The present application claims priority under 35 U.S.C. § 119(e) from Chinese Patent Application No. 201610463177.4 filed on Jun. 23, 2016 naming Ya Jing, et al. as inventors. The entire disclosure of Chinese Patent Application No. 201610463177.4 is specifically incorporated herein by reference.

BACKGROUND

In multiple input multiple output (MIMO) communications systems, multiple antennas are used on both the base station and on the receiver or transmitter that communicates with the base station to exploit a phenomenon known as multipath propagation in order to achieve higher data rates. In general, MIMO communications systems simultaneously send and receive multiple data signals over each radio channel. The multipath propagation phenomenon is the result of environmental factors that influence the data signals as they travel between the base station and the transmitter or receiver, including, for example, ionospheric reflection and refraction, atmospheric ducting, reflection from terrestrial objects and reflection from bodies of water. Because of these factors, the data signals experience multipath interference that results in constructive interference, destructive interference, or fading, and phase shifting of the data signals. MIMO technology has been standardized in various wireless communications standards including Institute of Electrical and Electronics Engineers (IEEE) 802.11n, IEEE 802.11ac, HSPA+ (3G), WiMAX (4G) and Long Term Evolution (LTE) standards.

MIMO communications systems require testing. A typical MIMO test system for testing a device under test (DUT) includes a base station emulator, a fading emulator, a personal computer (PC) that functions as a test instrument, some type of multi-probe antenna configuration, and various electrical cables for interconnecting the components. In some MIMO test systems, the output ports of the fading emulator are connected to the antenna ports of the DUT by electrical cables. This type of MIMO test system is known as a cable-conducted MIMO test system. Disadvantages to this type of MIMO test system include having to break open the DUT to access the antenna ports of the DUT, unavailability of DUT antenna ports in some cases, and the need to take active antenna effects into account.

Another type of MIMO test system that is used to test DUTs is a multi-probe anechoic chamber (MPAC) over-the-air (OTA) test system. In a typical MPAC OTA system, the DUT is located inside of an anechoic chamber that includes a multi-antenna probe configuration. The output ports of the fading emulator are connected to the respective antenna probes of the chamber.

Another known MIMO test system uses a radiated two-stage (RTS) methodology. The test set up is similar to that of the MPAC OTA set up. In the first stage, the radiation pattern of the DUT is determined based on signal power and relative phase reported by the DUT to the test instrument. In the second stage, the DUT is placed inside of another chamber that is equipped with a plurality of probe antennas. During the second stage, calibration is performed to measure the radiation channel matrix for the OTA channel between the probe antennas and the antennas of the DUT. The inverse matrix of the radiation channel matrix is calculated and multiplied by the channel model being emulated by the fading emulator. A disadvantage of this test system is that the radiation channel matrix includes values associated with properties of the DUT antennas, and it is limited to cases where the radiation channel matrix is not greater than a 2-by-2 matrix. For this reason, the inverse matrix cannot be accurately measured for all cases, and therefore the test system cannot be accurately calibrated. Consequently, the DUT performance measurements obtained by the test system are not as accurate as they should be.

A need exists for a robust MIMO OTA radiated test system that eliminates the need to make wired connections to the antenna ports of the DUT, that is capable of accurately measuring the radiation channel matrix so that testing can be more accurately performed, and that is not limited with regard to the dimensions of the radiation channel matrix.

SUMMARY

The present embodiments are directed to a test system, method and computer code for performing non-cable-conducted OTA radiated calibration and test modes of operations. The test system comprises an anechoic chamber, a plurality of probe antennas disposed in the chamber, and a test instrument. A DUT located in the chamber has a plurality of antenna elements electrically coupled to respective antenna ports of the DUT. The DUT is in communication with the test instrument. During the calibration mode of operations, the test instrument causes predetermined signals to be transmitted over a transmission channel comprising a non-cable-conducted, OTA interface between the probe antennas of the chamber and the antenna ports of the DUT and obtains measurements of received power and relative phase for the predetermined signals. The test instrument uses the measurements obtained during the calibration mode of operations to construct a radiation channel matrix associated with the transmission channel and obtains an inverse matrix of the radiation channel matrix. During a test mode of operations, the test system performs a non-cable-conducted, OTA radiated test during which the test instrument applies the inverse matrix to DUT performance measurements obtained by the test instrument to calibrate out the radiation channel matrix from the DUT performance measurements.

The method comprises:

locating a DUT in an anechoic chamber, the DUT having a plurality of antenna elements electrically coupled to respective antenna ports of the DUT, the chamber having a plurality of probe antennas disposed therein, the DUT being in communication with a test instrument of the test system; and during a calibration mode of operations, causing predetermined signals to be transmitted over a transmission channel comprising a non-cable-conducted, OTA interface between the probe antennas of the chamber and the antenna ports of the DUT and obtaining measurements of received power and relative phase for the predetermined signals;

in the test instrument, using the measurements obtained during the calibration mode of operations to construct a radiation channel matrix associated with the transmission channel;

in the test instrument, obtaining an inverse matrix of the radiation channel matrix; and during a test mode of operations, performing a non-cable-conducted, OTA radiated test that applies the inverse matrix to DUT performance measurements obtained by the test instrument to calibrate out the radiation channel matrix from the DUT performance measurements.

The computer code comprises:

a first code portion that causes predetermined signals to be transmitted over a transmission channel comprising a non-cable-conducted, OTA interface between probe antennas disposed in an anechoic chamber and antenna ports of the DUT and obtaining measurements of received power and relative phase for the predetermined signals;

a second code portion that uses the measurements obtained by the first code portion to construct a radiation channel matrix associated with the transmission channel;

a third code portion that obtains an inverse matrix of the radiation channel matrix; and a fourth code portion that applies the inverse matrix to DUT performance measurements obtained by the test instrument while performing a non-cable-conducted, OTA radiated test to calibrate out the radiation channel matrix from the DUT performance measurements.

These and other features and advantages will become apparent from the following description, claims and drawings.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
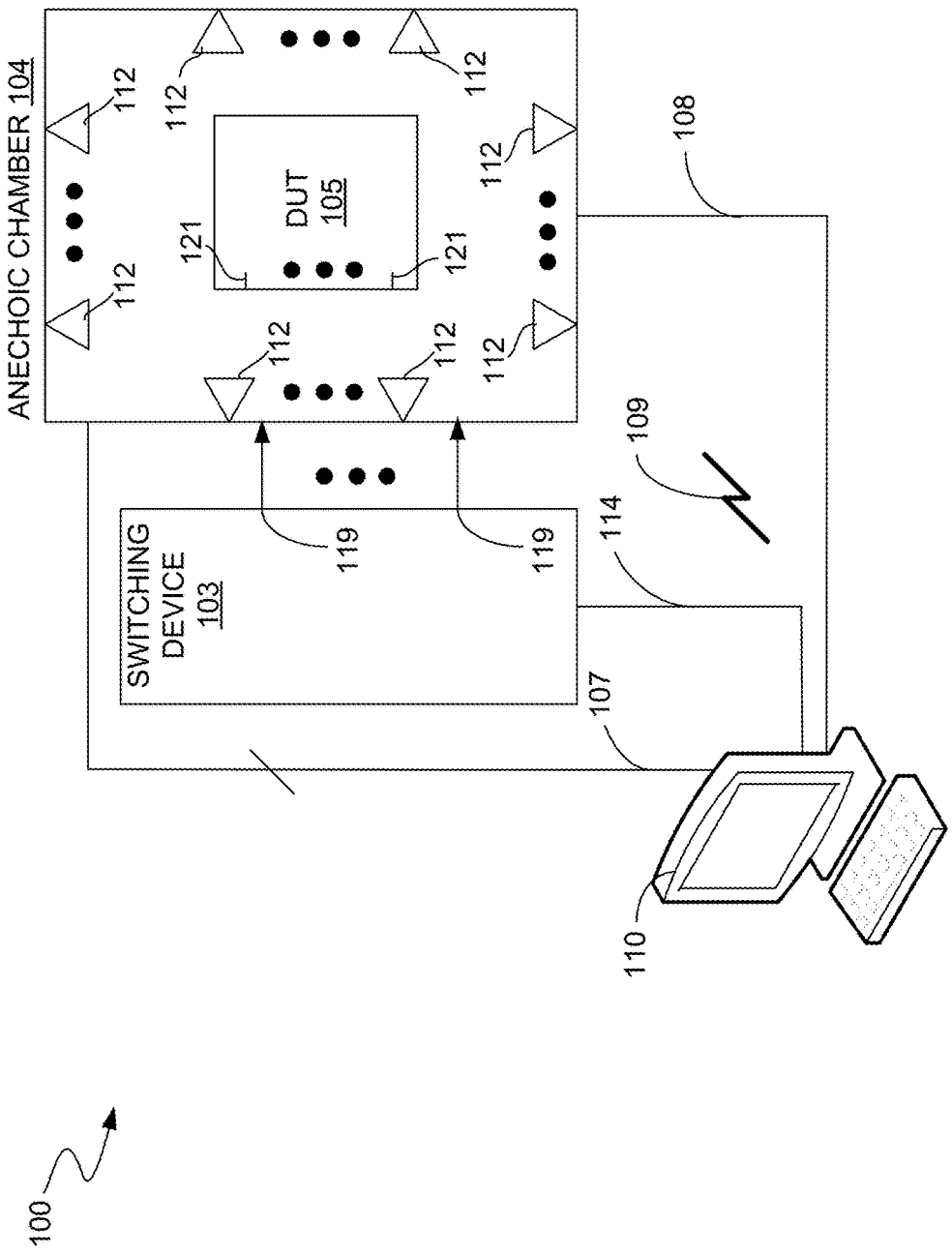
FIG. 1 is a schematic block diagram illustrating a MIMO OTA radiated test system in accordance with an illustrative embodiment.

In accordance with embodiments described herein, a MIMO test system and method perform non-cable-conducted OTA radiated calibration and test modes of operations. A DUT is located in an anechoic chamber having a plurality of probe antennas disposed therein in communication with a base station emulator of the test system. The DUT has a plurality of antenna elements electrically coupled to respective antenna ports of the DUT. The DUT is in communication with a test instrument of the test system. During a calibration mode of operations, the test instrument causes predetermined signals to be transmitted over a transmission channel comprising a non-cable-conducted, OTA interface between the probe antennas of the chamber and the antenna ports of the DUT and obtains measurements of received power and relative phase for the predetermined signals. The test instrument uses the measurements obtained during the calibration mode of operations to construct a radiation channel matrix associated with the transmission channel. The test instrument obtains an inverse matrix of the radiation channel matrix. During a test mode of operations, the test system performs a non-cable-conducted, OTA radiated test during which the test instrument applies the inverse matrix to DUT performance measurements obtained by the test instrument to calibrate out the radiation channel matrix from the DUT performance measurements.

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor", as that term is used herein encompasses an electronic component that is able to execute a computer program or executable computer instructions. References herein to a computer comprising "a processor" should be interpreted as a computer having one or more processors or processing cores. The processor may for instance be a multi-core processor. A processor may also refer to a collection of processors within a single computer system or distributed amongst multiple computer systems. The term "computer" should also be interpreted as possibly referring to a collection or network of computers or computing devices, each comprising a processor or processors. Instructions of a computer program can be performed by multiple processors that may be within the same computer or that may be distributed across multiple computers.

FIG. 1 illustrates a block diagram of the MIMO test system 100 in accordance with an exemplary, or illustrative, embodiment. In accordance with this illustrative embodiment, the MIMO test system 100 comprises a switching device 103, an anechoic chamber 104, and a computer 110, which may be, for example, a personal computer (PC). A DUT 105 is disposed inside of the chamber 104. The computer 110 is electrically coupled by electrical cables 107 and 114 to the anechoic chamber 104 and to the switching device 103, respectively. A plurality of probe antennas 112 are located inside of the chamber 104 at various locations relative to the DUT 105. The computer 110 is in communication with the DUT 105 via either a wired communication link, represented by line 108, or a wireless communication link, represented by wireless symbol 109. It is not necessary to make any cable connections to antenna connectors (not shown) of the DUT 105. In the case of a wired communication link being used between the computer 110 and the DUT 105, opposite ends of one or more electrical cables are connected to an input/output (I/O) port (not shown) on the DUT 105 and to an I/O port (not shown) on the computer 110. The I/O ports of the DUT 105 and of the computer 110 may be, for example, Universal Serial Bus (USB) ports.

In accordance with an illustrative embodiment, the DUT 105 is a base station having a transmitter and a receiver and the test system 100 is used to test the receiver and the transmitter of the base station DUT 105. Each of the antenna ports 121 of the DUT 105 has an antenna element (not shown) electrically coupled thereto, each of which is electrically coupled to transmitter and receiver circuitry (not shown) of the DUT 105.

As will be described below in more detail, when the receiver of the DUT 105 is being calibrated or tested, the computer 110 causes the switching device 103 to select particular subsets of the probe antennas 112 to be used to transmit RF signals inside of the chamber 104. The test system 100 may include other components for facilitating testing. For example, if the receiver performance of the DUT 105 is being tested, then the test system 100 may include a base station or base station emulator (not shown). If the throughput of the DUT 105 is being tested, then the test system 100 may include a fading emulator (not shown). When the transmitter of the DUT 105 is being tested, the computer 110 causes the switching device 103 to select particular subsets of the probe antennas 112 to be used to receive RF signals to be carried back to the computer 110. In accordance with an embodiment, the switching device 103 has the capability of activating or deactivating the channels connected to each of the probe antennas 112 in accordance with instructions received from the computer 110. In accordance with an illustrative embodiment, the computer 110 is configured to selectively turn on or off any transmission channel or any receive channel of the transmitter or receiver, respectively, of the DUT 105.

Before the transmitter or receiver of the DUT 105 can be tested, the radiation channel matrix between the probe antennas 112 that will be used during the test and the antenna ports 121 of the DUT 105 is accurately measured so that the inverse matrix of the radiation channel matrix can be applied during a calibration step prior to or while performing actual testing. The manner in which the radiation channel matrix is determined for the receiver of the DUT 105 will first be described and then the manner in which the radiation channel matrix for the transmitter of the DUT 105 is determined will then be described.

Figure 2:
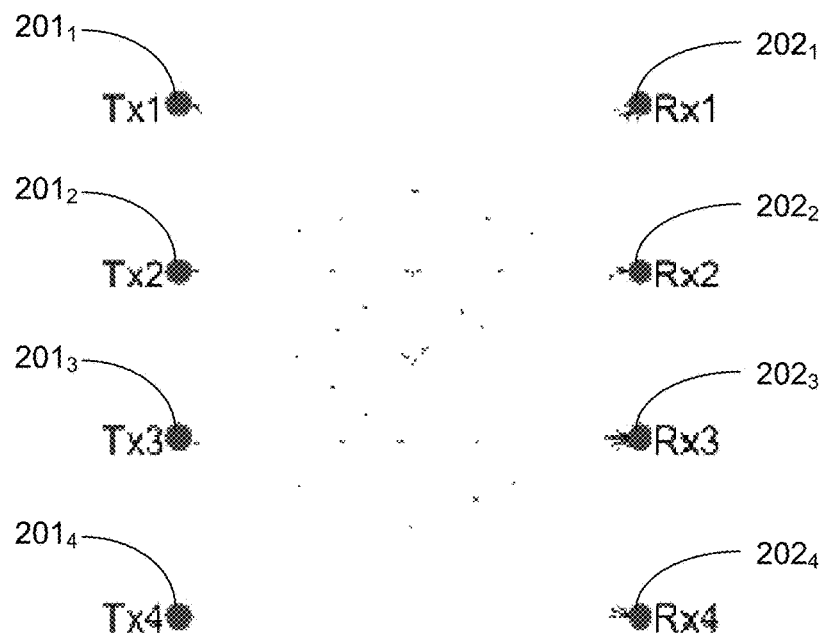
FIG. 2 is a pictorial diagram showing how the signals transmitted by each of the probe antennas (Tx1-Tx4) are received by each of the antenna ports (Rx1-Rx4).
Figure 3:
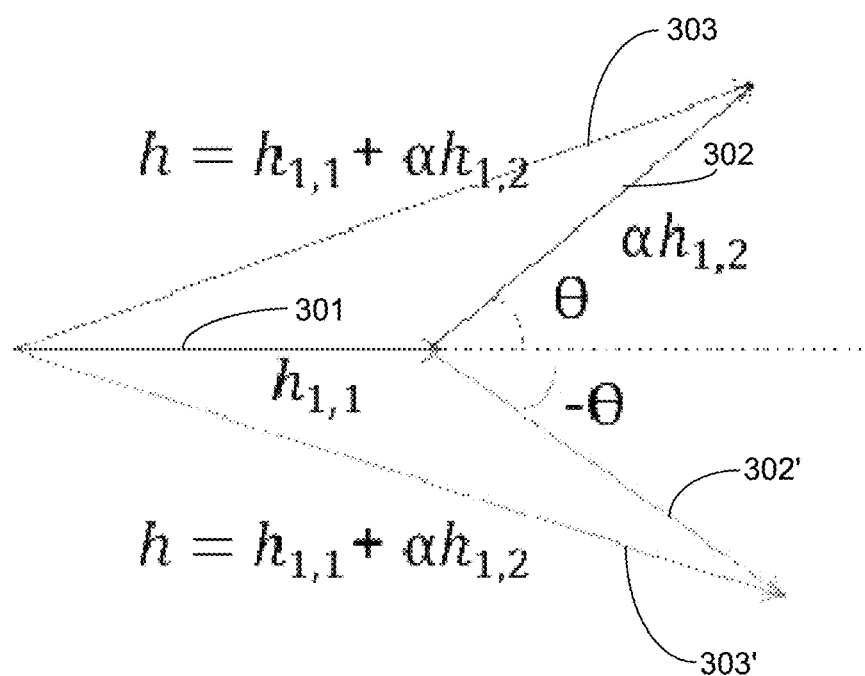
FIG. 3 illustrates trigonometrically how measured values that are needed for the radiation channel matrix can be used to derive other values that are needed for the radiation channel matrix.

FIG. 2 is a pictorial diagram showing how the signals transmitted by each of the probe antennas (Tx1-Tx4) labeled $201_1$-$201_N$ are received by each of the antenna ports (Rx1-Rx4) labeled $202_1$-$202_N$. Thus, in the embodiment shown in FIG. 2, M=N=4. FIG. 3 illustrates trigonometrically how measured values that are needed for the radiation channel matrix can be used to determine other values that are needed for the radiation channel matrix. In accordance with a preferred embodiment, the DUT 105 has the capability of measuring and reporting the received power of the signals received at the antenna ports 121 as well as the relative phase between the signals received at each of the antenna ports 121 that were transmitted by the same probe antenna 112. This information is reported by the DUT 105 to the computer 110 via one of the communications links 108 or 109. The radiation channel response between the $j^{th}$ Tx and the $i^{th}$ Rx can be represented by $h_{i,j}$, where i identifies the Rx antenna port $202_1$-$202_N$ that received the signal and j identifies the Tx probe antenna $201_1$-$201_N$ that transmitted the signal. If $h_{i,j}$ can be measured accurately, the inverse matrix can be calculated and applied in the computer 110 during the calibration step.

For example when only the channel connected with Tx1 $201_1$ is turned on, the DUT 105 measures and reports the amplitude of $h_{1,1}$, $h_{2,1}$, $h_{3,1}$ and $h_{4,1}$, and also the relative phase between $h_{2,1}$ and $h_{1,1}$, between $h_{3,1}$ and $h_{1,1}$ and between $h_{4,1}$ and $h_{1,1}$. In the same way, when only the channel connected to Tx2 $201_2$ is turned on, the DUT 105 measures and reports the amplitude of $h_{1,2}$, $h_{2,2}$, $h_{3,2}$ and $h_{4,2}$ and the relative phase between $h_{2,2}$ and $h_{1,2}$, between $h_{3,2}$ and $h_{2,2}$ and between $h_{4,2}$ and $h_{2,2}$. Likewise, when only the channel connected to Tx3 $201_3$ is turned on, the DUT 105 reports the amplitude of $h_{1,3}$, $h_{2,3}$, $h_{3,3}$ and $h_{4,3}$ and the relative phase between $h_{3,3}$ and $h_{1,3}$, between $h_{3,3}$ and $h_{2,3}$ and between $h_{3,3}$ and $h_{4,3}$. Likewise, when only the channel connected to Tx4 $201_4$ is turned on, the DUT 105 reports the amplitude of $h_{1,4}$, $h_{2,4}$, $h_{3,4}$ and $h_{4,4}$ and the relative phase between $h_{4,4}$ and $h_{1,4}$, between $h_{4,4}$ and $h_{2,4}$ and between $h_{4,4}$ and $h_{3,4}$.

Figure 4A:
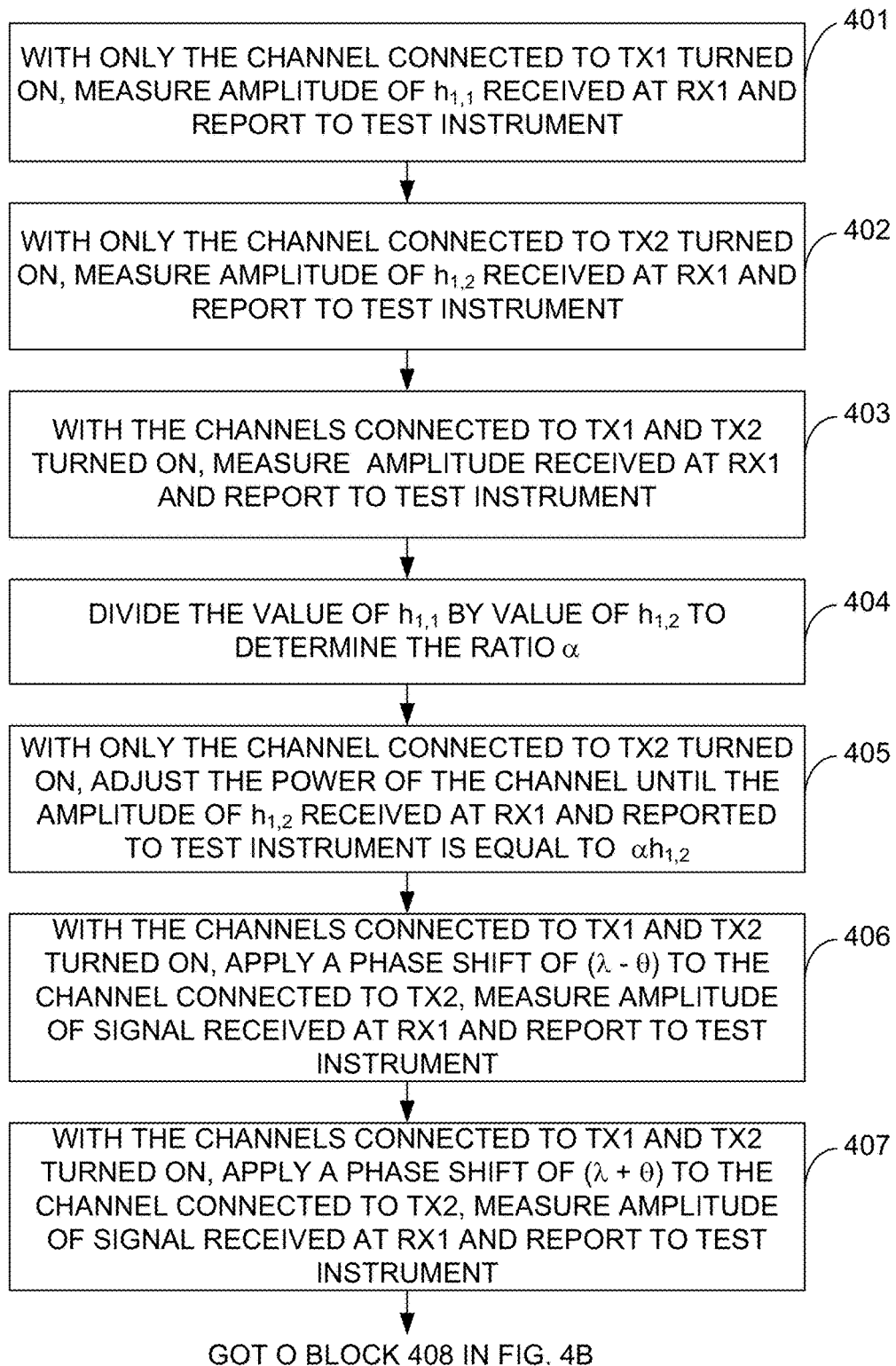
FIGS. 4A and 4B illustrate a flow diagram that represents the method in accordance with an illustrative embodiment performed by the system shown in FIG. 1 for testing a receiver of the DUT shown in FIG. 1.
Figure 4B:
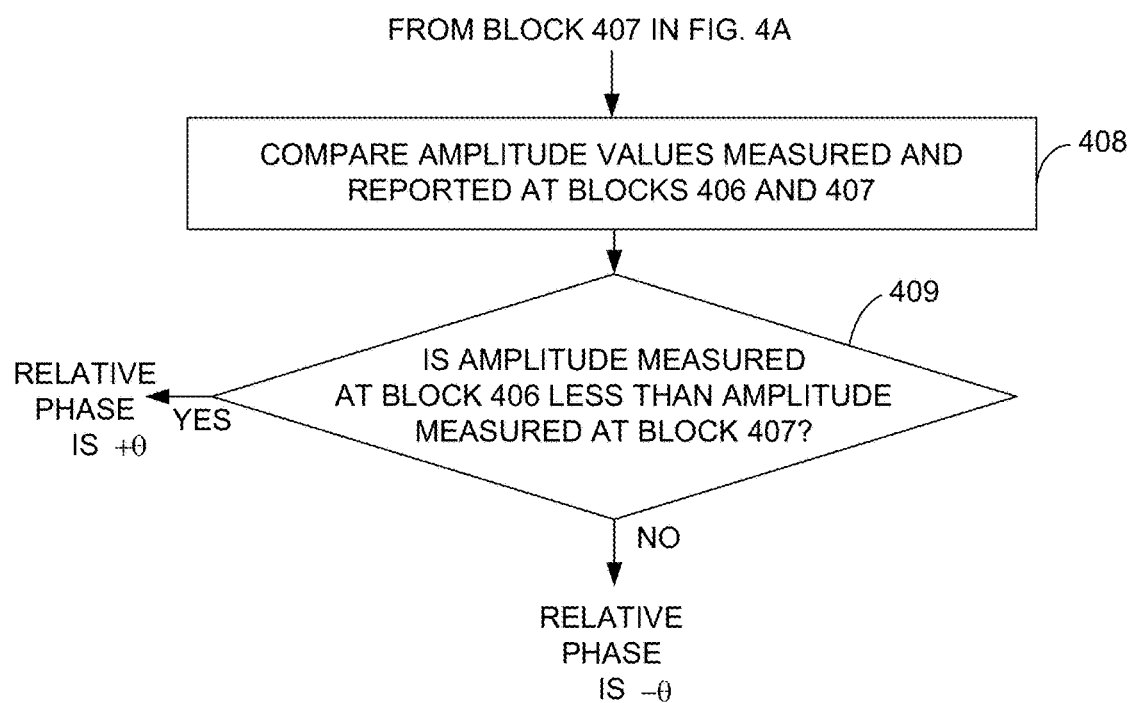

The challenge then is how to measure the relative phase between channels that transmitted signals from different Tx probe antennas $201_1$-$201_N$ that were received by the same antenna port $202_1$-$202_N$ of the DUT 105. For example, DUTs do not currently have the capability of measuring the relative phase between $h_{1,1}$ and $h_{1,2}$. FIGS. 4A and 4B illustrate a flow diagram that represents the method in accordance with an illustrative embodiment for determining the relative phase between signals transmitted from different Tx probe antennas $201_1$-$201_N$ and received by the same DUT antenna port $202_1$-$202_N$ to be used with the values reported to the computer 110 by the DUT 105 in order to determine the radiation channel matrix for the receiver of the DUT 105. For exemplary purposes, the method will be described with reference to determining the relative phase between predetermined signals transmitted by channels connected to probe antennas Tx1 $201_1$ and Tx2 $201_2$ and received by DUT antenna port Rx1 $202_1$. The same process would be performed for the other Tx probe antennas $201_2$-$201_N$ and each of the Rx antenna ports $202_1$-$202_N$ of the DUT 105, and therefore the process will not be described for each of these cases in the interest of brevity. The predetermined signals may be standardized signals.

The relative phase between $h_{1,1}$ and $h_{1,2}$ is determines as follows. With only the channel connected to the Tx1 probe antenna $201_1$ turned on, the DUT 105 measures the amplitude $|h_{1,1}|$ received by antenna port Rx1 $202_1$ of the DUT 105 and reports the measurement to test instrument, as indicated by block 401. In the illustrative embodiment, the test instrument is the computer 110 shown in FIG. 1. The term $|h_{1,1}|$ represents the absolute value of the amplitude $h_{1,1}$ of the signal received at antenna port Rx1 $202_1$ of the DUT 105 and transmitted by the Tx1 probe antenna $201_1$. Then, with only the channel connected to the Tx2 antenna probe $201_2$ turned on, the DUT 105 measures the amplitude $|h_{1,2}|$ of the signal transmitted by TX2 probe antenna $201_2$ and received by antenna port Rx1 $202_1$ of the DUT 105 and reports it to the computer 110, as indicated by block 402. Then, with the channels connected with the Tx1 and Tx2 probe antennas $201_1$ and $201_2$, respectively, turned on and all other channels turned off, the DUT 105 measures the amplitude received by antenna port Rx1 $202_1$ as $|h_3|=|h_{1,1}+h_{1,2}|$ and reports it to the computer 110, as indicated by block 403. The term $|h_3|$ is the absolute value of the vector sum of $h_{1,1}$ and $h_{1,2}$. The absolute values of the amplitudes $h_{1,1}$, $h_{1,2}$ and $h_3$ correspond to the lengths of the three sides 301, 302 and 303, respectively, of the upper triangle shown in FIG. 3.

Having determined the lengths of the three sides 301-303 of the triangle, the angles between any two sides 301-303 of the triangle 300 shown in FIG. 3 can be derived, i.e., the relative phase, $\theta$, can be determined, as will be understood by those skilled in the art. However, there is still a relative phase+/−ambiguity, as indicated by the sides 302' and 303' of the lower triangle shown in FIG. 3. In other words, the relative phase $\theta$ between $h_{1,1}$ and $h_{1,2}$ can be positive or negative. The following steps are performed to remove this phase ambiguity.

The ratio of $|h_{1,1}|$ to $|h_{1,2}|$ is calculated to obtain a value $\alpha$ that satisfies the relationship: $|h_{1,1}|=\alpha|h_{1,2}|$, as indicated by block 404. Then, with only the channel connected with the probe antenna Tx2 $201_2$ turned on, the output power of the channel that is connected with the probe antenna Tx2 $201_2$ is adjusted to scale the amplitude of $h_{1,2}$ by the value of a, as indicated by block 405. Then, with the channels connected with the probe antennas Tx1 $201_1$ and Tx2 $201_2$ both turned on, a phase shift of $(\pi-\theta)$ is applied on the channel connected with the probe antenna Tx2 $201_2$, and the amplitude of the signal received at the antenna port Rx1 $202_1$ of the DUT 105 is measured and reported by the DUT 105 to the computer 110, as indicated by block 406. Then, with the channels connected with the probe antennas Tx1 $201_1$ and Tx2 $201_2$ both turned on, a phase shift of $(\pi+\theta)$ is applied on the channel connected with the probe antenna Tx2 $201_2$, and the amplitude of the signal received at the antenna port Rx1 $202_1$ of the DUT 105 is measured and reported by the DUT 105 to the computer 110, as indicated by block 407. The amplitude values measured and reported at blocks 406 and 407 are compared to determine whether the amplitude value measured at block 406 is less than the amplitude value measured at block 407, as indicated by block 408 in FIG. 4B. If so, then a decision is made at block 409 that the relative phase is $+\theta$. If not, then a decision is made at block 409 that the relative phase is $-\theta$.

For each antenna port Rx1 $202_1$-Rx4 $202_N$, the steps shown in FIGS. 4A and 4B can be performed to determine the amplitude and relative phase of signals transmitted by different Tx probe antennas $201_1$-$201_N$ and received by the same antenna port Rx1 $202_1$-$202_N$. As indicated above, the DUT 105 measures and reports the amplitude and the relative phase of signals transmitted from any one of the Tx1-Tx4 probe antennas $201_1$-$201_N$ and received by two different Rx1-Rx4 antenna ports $202_1$-$202_N$, so the task of obtaining that amplitude and relative phase information can be easily accomplished before the process represented by FIGS. 4A and 4B is performed. Once the process represented by the flow diagram of FIGS. 4A and 4B has been performed, all of the amplitude and relative phase information is used to construct the radiation channel matrix. In the 4-by-4 system shown in FIG. 2 as an example (i.e., N=4), the radiation channel matrix can be expressed as indicated below in Equation 1, where all the phase values denoted as $\theta$ are measured by using the method described above with reference to FIGS. 4A and 4B and the phase values denoted as $\phi$ are the phase values that are measured and reported by the DUT 105 to the computer 110.

$$\begin{array}{llll} |h_{11}| & |h_{12}|e^{i(\theta_2)} & |h_{13}|e^{i(\theta_3)} & |h_{14}|e^{i(\theta_4)}; \\ |h_{21}|e^{i(\theta_{21})} & |h_{22}|e^{i(\theta_2+\phi_{22})} & |h_{23}|e^{i(\theta_3+\phi_{23})} & |h_{24}|e^{i(\theta_4+\phi_{24})}; \\ |h_{31}|e^{i(\theta_{31})} & |h_{32}|e^{i(\theta_2+\phi_{32})} & |h_{33}|e^{i(\theta_3+\phi_{33})} & |h_{34}|e^{i(\theta_4+\phi_{34})}; \\ |h_{31}|e^{i(\theta_{41})} & |h_{42}|e^{i(\theta_2+\phi_{42})} & |h_{43}|e^{i(\theta_3+\phi_{43})} & |h_{44}|e^{i(\theta_4+\phi_{44})} \end{array} \quad \text{Equation 1}$$

During actual testing, the subset of probe antennas 112 that was used to obtain the radiation channel matrix is used by computer 110 to perform the actual OTA radiated test. During the OTA radiated test, when the computer 110 causes the switching device 103 to select a particular subset of probe antennas 112 to be used during the test, the computer 110 applies the inverse matrix of the radiation channel matrix that was obtained using that same subset of probe antennas 112 that was used to perform the method represented by the flow diagram of FIGS. 4A and 4B. This causes the radiation channel matrix to be calibrated out. The calibration operation can be performed in real-time as part of the OTA radiated test or it can be performed as a separate process prior to performing the OTA radiated test. The inclusion of the switching device 103 in the test system allows the computer 110 to select a subset of the probe antennas 112 that provides the best environment for calibration and testing. This ensures that a non-ill-conditioned radiation channel matrix is measured. Persons of skill in the art will understand the manner in which the inverse matrix is obtained from the corresponding radiation channel matrix and used to calibrate out the corresponding radiation channel matrix. Therefore, in the interest of brevity, the algorithm for applying the inverse matrix to calibrate out the calibration matrix will not be described herein.

Figure 5A:
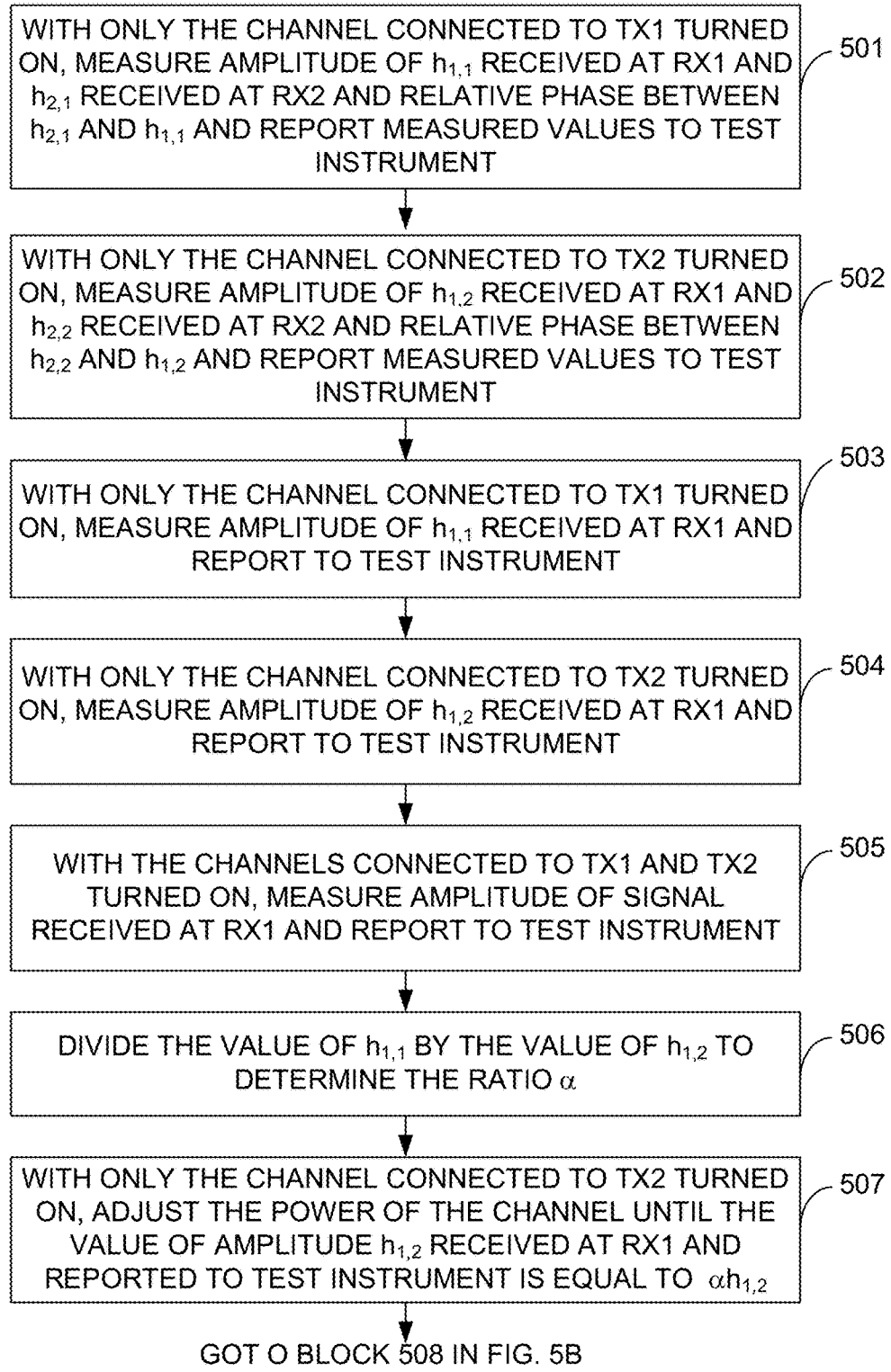
FIGS. 5A and 5B illustrate a flow diagram that represents the method in accordance with an illustrative embodiment for testing a transmitter of the DUT shown in FIG. 1.
Figure 5B:
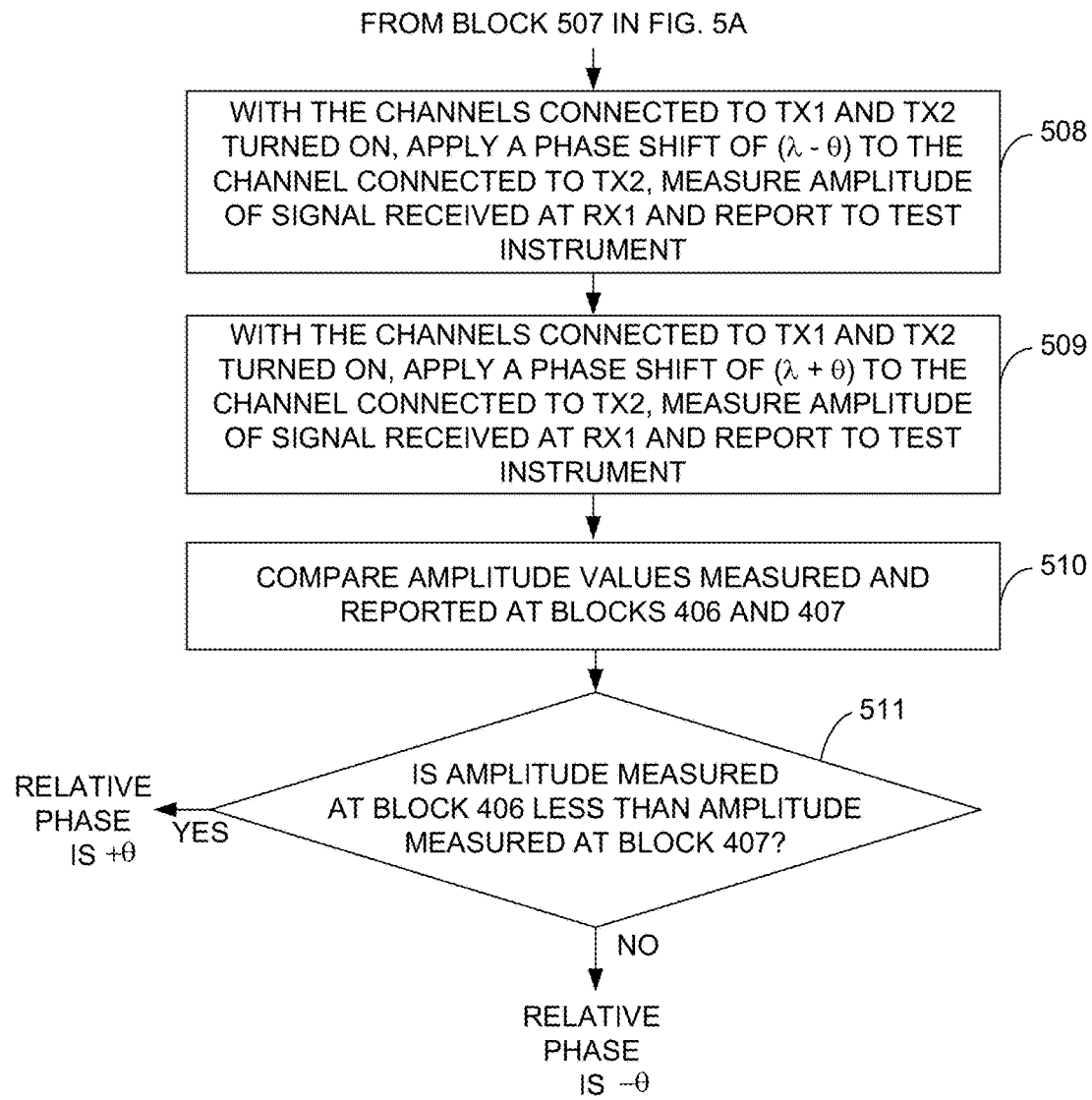

The manner in which the radiation channel matrix for the transmitter of the DUT 105 is obtained will now be described with reference again to FIGS. 2 and 3, 5A and 5B. FIGS. 5A and 5B illustrate a flow diagram that represents the method in accordance with an illustrative embodiment for determining the radiation channel matrix for the transmitter of the DUT 105. In this case, Tx1 $201_1$-Tx4 $201_N$ represent the antenna ports of the DUT 105 and Rx1 $202_1$-Rx4 $202_N$ represent the probe antennas 112 of the subset of probe antennas 112 selected by the switching device 103. The manner in which the radiation channel matrix for the transmitter of the DUT 105 is obtained is very similar to the manner discussed above in which the radiation channel matrix for the receiver of the DUT 105 is obtained. With only the channel connected with antenna port Tx1 $201_1$ of the DUT 105 turned on, the computer 110 measures the amplitudes of the signals $h_{1,1}$ and $h_{2,1}$ received by the probe antennas $202_1$ and $202_2$, respectively, and transmitted by the antenna port $201_1$ of the DUT 105 as well as the relative phase between the signals $h_{2,1}$ and $h_{1,1}$, as indicated by block 501. In the same way, when only the channel connected to antenna port Tx2 $201_2$ of the DUT 105 is turned on, the computer 110 measures the amplitude of the signals $h_{1,2}$ and $h_{2,2}$ received by probe antennas Rx1 $202_1$ and Rx2 $202_2$ as well as the relative phase between the signals $h_{2,2}$ and $h_{1,2}$, as indicated by block 502. In the 4-by-4 example shown in FIG. 2, the steps represented by blocks 501 and 502 continue to be performed until the rest of the signal amplitudes for $h_{1,3}$, $h_{2,3}$, $h_{3,3}$, $h_{4,3}$, $h_{1,4}$, $h_{2,4}$, $h_{3,4}$ and $h_{4,4}$ and the relative phases between $h_{3,3}$ and $h_{1,3}$, between $h_{3,3}$, $h_{2,3}$, between $h_{3,3}$ and $h_{4,3}$, between $h_{4,4}$ and $h_{1,4}$, between $h_{4,4}$ and $h_{2,4}$, and between $h_{4,4}$ and $h_{3,4}$ have been measured by the the computer 110.

Once the steps represented by blocks 501 and 502 have been performed, the remainder of the process shown in FIGS. 5A and 5B represented by blocks 503-511 are identical to the process steps represented by blocks 401-409, respectively, shown in FIGS. 4A and 4B, except that in the description of FIGS. 5A and 5B, Rx1-Rx4 correspond to the probe antennas 112 located inside of the chamber 104 and Tx1-Tx4 correspond to the antenna ports of the DUT 105. The relative phase between $h_{1,1}$ and $h_{1,2}$ is determines as follows. With only the channel connected to the Tx1 antenna port $201_1$ of the DUT 105 turned on, the computer 110 measures the amplitude $|h_{1,1}|$ received by probe antenna Rx1 $202_1$, as indicated by block 503. Then, with only the channel connected to the Tx2 antenna port $201_2$ of the DUT 105 turned on, the computer 110 measures the amplitude $|h_{1,2}|$ of the signal received by probe antenna Rx1 $202_1$ via link 115 and reports it to the computer 110 via link 106, as indicated by block 504. Then, with the channels connected with the Tx1 and Tx2 antenna ports $201_1$ and $201_2$ of the DUT 105, respectively, turned on and all other channels turned off, the computer 110 measures the amplitude received by probe antenna Rx1 $202_1$ as $|h_3|=|h_{1,1}+h_{1,2}|$ and reports it via link 106 to the computer 110, as indicated by block 505. As indicated above with reference to FIG. 3, the absolute values of the amplitudes $h_{1,1}$, $h_{1,2}$ and $h_3$ correspond to the lengths of the three sides 301, 302 and 303, respectively, of the upper triangle shown in FIG. 3.

Having determined the lengths of the three sides 301-303 of the triangle, the relative phase θ can be determined, but there is still the relative phase+/−ambiguity discussed above with reference to FIGS. 4A and 4B. The following steps are performed to remove this phase ambiguity. The ratio of $|h_{1,1}|$ to $|h_{1,2}|$ is calculated to obtain a value α that satisfies the relationship: $|h_{1,1}|=\alpha|h_{1,2}|$, as indicated by block 506. Then, with only the channel connected with the antenna port Tx2 $201_2$ of the DUT 105 turned on, the output power of the channel that is connected with the antenna port Tx2 $201_2$ of the DUT 105 is adjusted to scale the amplitude of $h_{1,2}$ by the value of α, as indicated by block 507. Then, with the channels connected with the antenna ports Tx1 $201_1$ and Tx2 $201_2$ of the DUT 105 both turned on, a phase shift of (π−θ) is applied on the channel connected with the antenna port Tx2 $201_2$ of the DUT 105, and the amplitude of the signal received at the probe antenna Rx1 $202_1$ is measured and reported by the base station emulator 101 to the computer 110, as indicated by block 508. Then, with the channels connected with the antenna ports Tx1 $201_1$ and Tx2 $201_2$ of the DUT 105 both turned on, a phase shift of (π+θ) is applied on the channel connected with the antenna port Tx2 $201_2$ of the DUT 105, and the amplitude of the signal received at the probe antenna Rx1 $202_1$ is measured by the computer 110, as indicated by block 509. The amplitude values measured and reported at blocks 508 and 509 are compared to determine whether the amplitude value measured at block 508 is less than the amplitude value measured at block 509, as indicated by block 510 in FIG. 5B. If so, then a decision is made at block 511 that the relative phase is +θ. If not, then a decision is made at block 511 that the relative phase is −θ.

For each probe antenna Rx1 $202_1$-Rx4 $202_N$, the steps shown in FIGS. 5A and 5B can be performed to determine the amplitude and relative phase of signals transmitted by different Tx antenna ports $201_1$-$201_N$ of the DUT 105 and received by the same Rx probe antenna $202_1$-$202_N$ as well as the amplitude and relative phase of the signals transmitted by the same Tx antenna port $201_1$-$201_N$ and received by different probe antennas $202_1$-$202_N$. Once the process represented by the flow diagram of FIGS. 5A and 5B has been performed, all of the amplitude and relative phase information is used to construct the radiation channel matrix expressed above in Equation 1, except that the only relative phase values there are in the equation are θ values since no relative phase values are reported by the DUT 105 when its transmitter is being tested. Thus, all of the ϕs are replaced by θs because no relative phase values are reported by the DUT 105 in this case.

The computer 110 has one or more processors (not shown) configured to execute computer instructions, or computer code, in the form of software and/or firmware to perform one or more of the algorithms described above with reference to FIGS. 4A-5B. These instructions are stored in one or more memory devices that are internal to or external to the computers 110. Such memory devices constitute non-transitory computer-readable mediums. A variety of non-transitory computer-readable mediums are suitable for use with the invention, including, for example, solid state storage devices, magnetic storage devices and optical storage devices.

While the invention has been illustrated and described in detail in the drawings and foregoing description, such illustration and description are to be considered illustrative or exemplary and not restrictive; the invention is not limited to the disclosed embodiments. Many variations may be made to the embodiments described above. As one example, the order of many of the steps represented by the blocks of the flow diagrams shown in FIGS. 4A-5B can be different from that which is depicted in the figures. For example, the steps represented by blocks 401 and 402 can be switched in order without changing results of the process. Likewise, the steps represented by blocks 406 and 407 can be switched in order without changing results of the process. The same is true of the steps represented by blocks 501 and 502 and of the steps represented by blocks 508 and 509. Other variations to the disclosed embodiments can be understood and effected by those skilled in the art in practicing the claimed invention, from a study of the drawings, the disclosure, and the appended claims.

What is claimed is:

1. A test system for testing a device under test (DUT) operating in a multiple-input multiple-output (MIMO) environment, the test system comprising:
    an anechoic chamber, the DUT being disposed in the chamber and having a plurality of antenna elements electrically coupled to respective antenna ports of the DUT;
    a plurality of probe antennas disposed in the chamber and in communication with a base station emulator; and
    a test instrument in communication with the DUT and the probe antennas, wherein during a calibration mode of operations, the test instrument performs a non-cable-conducted, over-the-air (OTA) radiated calibration process that constructs a radiation channel matrix associated with a transmission channel between a reference point of the DUT and an interface of the test instrument, and wherein during a test mode of operations, the test instrument performs a non-cable-conducted, OTA radiated test that applies an inverse matrix that is an inverse of the measured radiation channel matrix to DUT performance measurements obtained by the test instrument to calibrate out the radiation channel matrix from the DUT performance measurements.

2. The test system of claim 1, further comprising:
a switching device electrically coupled to the probe antennas and to the test instrument, wherein the test instrument is configured to control the switching device to cause the switching device to select different configurations of the probe antennas to provide predetermined transmission channel characteristics for the non-cable-conducted, OTA radiated calibration process and test to be performed.

3. The test system of claim 2, wherein the DUT comprises at least a first receiver, wherein when the test system is performing the non-cable-conducted, radiated OTA calibration process on the first receiver, the test instrument selectively activates transmission channels connected to the respective probe antennas of the selected configuration of probe antennas to cause predetermined signals to be transmitted to the DUT via the respective probe antennas, and wherein the test instrument receives one or more reports of received power and relative phase reported by the DUT to the test instrument, and wherein the test instrument selectively activates transmission channels connected to the probe antennas of the selected configuration of probe antennas while measuring amplitude values received from the DUT of respective signals transmitted by the probe antennas and received by the antenna ports of the DUT, the test instrument using the reported received power and relative phase values and the measured amplitude values to construct the radiation channel matrix and obtaining the inverse matrix from the constructed radiation channel matrix.

4. The test system of claim 3, wherein the DUT has at least first and second antenna ports and the test system has at least first and second probe antennas, said at least first and second probe antennas corresponding to said selected configuration of probe antennas, wherein the test instrument obtains the measured amplitude values by:
with a second transmission channel connected to the second probe antenna turned off and a first transmission channel connected to the first probe antenna turned on, causing a first predetermined signal to be transmitted by the first probe antenna and receiving a report from the DUT of a measurement of received power, $h_{1,1}$, at the first antenna port of the DUT;
with the first transmission channel turned off and the second transmission channel turned on, causing a second predetermined signal to be transmitted by the second probe antenna and receiving a report from the DUT of a measurement of received power, $h_{1,2}$, at the first antenna port of the DUT; and
with the first and second transmission channels turned on, causing the first and second predetermined signals to be transmitted by the first and second probe antennas, respectively, and receiving a report from the DUT of a measurement of received power, $h_3=h_{1,1}+h_{1,2}$, at the first antenna port of the DUT.

5. The test system of claim 4, wherein the test instrument uses the measurements of received power, $h_{1,1}$, $h_{1,2}$ and $h_3$ to determine a relative phase, θ, between the first and second predetermined signals transmitted by the first and second probe antennas, respectively.

6. The test system of claim 5, wherein the test instrument determines a sign of the relative phase, θ, by:
dividing the measured received power $h_{1,1}$ by the measured received power $h_{1,2}$ to obtain a ratio, α;
with the second transmission channel turned on and the first transmission channel turned off, measuring the received power at the first antenna port while adjusting a power of the second transmission channel to scale an amplitude of the second predetermined signal being transmitted by the second probe antenna by α;
with the first and second transmission channels turned on such that the first probe antenna is transmitting said first predetermined signal and the second probe antenna is transmitting the scaled second predetermined signal, applying a first phase shift of π−θ to the scaled second predetermined signal and obtaining a measurement of the received power at the first antenna port from the DUT;
with the first and second transmission channels turned on such that the first probe antenna is transmitting said first predetermined signal and the second probe antenna is transmitting the scaled second predetermined signal, applying a second phase shift of π+θ to the scaled second predetermined signal and obtaining a measurement of the received power at the first antenna port from the DUT; and
determining whether the measurement of the received power obtained when applying the first phase shift is less than the received power obtained when applying the second phase shift, and if so, deciding that the sign of the relative phase θ is positive, and if not, deciding that the sign of the relative phase θ is negative.

7. The test system of claim 2, wherein the test instrument constructs the radiation channel matrix by:
selectively turning on and off different transmission channels connected to different antennas probes of the selected configuration of antenna probes to cause predetermined signals to be transmitted by respective probe antennas that are connected to the transmission channels that are turned on;
receiving reports from the DUT of received power of the predetermined signals received at each antenna port of the DUT from a same one of the probe antennas that is connected to a transmission channel that is turned on and of relative phase between the predetermined signals received each antenna port from said same probe antenna;
receiving measurements from the DUT of received power of the predetermined signals received at a same one of the antenna ports from multiple probe antennas that are connected to transmission channels that are turned on; and
using the received measurements to determine a relative phase between the predetermined signals transmitted by said multiple probe antennas; and
using the reported received power and relative phase, the received measurements of received power and the determined relative phase to construct the radiation channel matrix.

8. The test system of claim 2, wherein the DUT comprises at least a first transmitter, wherein when the test system is performing the non-cable-conducted, radiated OTA calibration process on the first transmitter, the test instrument causes the DUT to selectively activate transmission channels connected to the respective antenna ports of the DUT to cause predetermined signals to be transmitted from the DUT via the respective antenna ports, and wherein the test instrument receives measurements of received power at respective probe antennas of the selected configuration of probe antennas, the test instrument using the received measurements to determine relative phase values between the predetermined signals transmitted by each antenna probe and the received by a same one of the probe antennas and to determine relative phase values between predetermined signals transmitted by all of the antenna ports of the DUT and received by a same probe antenna, the test instrument using the received measurements of received power and the determined relative phase values to construct the radiation channel matrix.

9. The test system of claim 8, wherein the DUT has at least first and second antenna ports and the test system has at least first and second probe antennas, said at least first and second probe antennas corresponding to said selected configuration of probe antennas, wherein the test instrument obtains the measured received power values by:
  with a second transmission channel connected to the second antenna port turned off and a first transmission channel connected to the first antenna port turned on, causing a first predetermined signal to be transmitted by the first antenna port and obtaining measurements of received power of the first predetermined signal at the first and second probe antennas and of relative phase between the first predetermined signal received at the first probe antenna and the first predetermined signal received at the second probe antenna;
  with the first transmission channel connected to the first antenna port turned off and the second transmission channel connected to the second antenna port turned on, causing a second predetermined signal to be transmitted by the second antenna port and obtaining measurements of received power of the second predetermined signal at the first and second probe antennas and of relative phase between the second predetermined signal received at the first probe antenna and the second predetermined signal received at the second probe antenna;
  with the second transmission channel connected to the second antenna port turned off and the first transmission channel connected to the first antenna port turned on, causing the first predetermined signal to be transmitted by the first antenna port and obtaining a measurement of received power, $h_{1,1}$, at the first probe antenna;
  with the first transmission channel turned off and the second transmission channel turned on, causing the second predetermined signal to be transmitted by the second antenna port and obtaining a measurement of received power, $h_{1,2}$, at the first probe antenna port; and
  with the first and second transmission channels turned on, causing the first and second predetermined signals to be transmitted by the first and second antenna ports, respectively, and obtaining a measurement of received power, $h_3=h_{1,1}+h_{1,2}$, at the first probe antenna.

10. The test system of claim 9, wherein the test instrument uses the measurements of received power, $h_{1,1}$, $h_{1,2}$ and $h_3$ to determine a relative phase, $\theta$, between the first and second predetermined signals transmitted by the first and second antenna ports, respectively, and wherein the test instrument uses the obtained measurements of received power and relative phase and the determined relative phase, $\theta$, to construct the radiation channel matrix.

11. The test system of claim 10, wherein the test instrument determines a sign of the relative phase, $\theta$, by:
  dividing the measured received power $h_{1,1}$ by the measured received power $h_{1,2}$ to obtain a ratio, $\alpha$;
  with the second transmission channel turned on and the first transmission channel turned off, measuring the received power at the first probe antenna while adjusting a power of the second transmission channel to scale an amplitude of the second predetermined signal being transmitted by the second antenna port by $\alpha$;
  with the first and second transmission channels turned on such that the first antenna port is transmitting said first predetermined signal and the second antenna port is transmitting the scaled second predetermined signal, applying a first phase shift of $\pi-\theta$ to the scaled second predetermined signal and obtaining a measurement of the received power at the first probe antenna;
  with the first and second transmission channels turned on such that the first antenna port is transmitting said first predetermined signal and the second antenna port is transmitting the scaled second predetermined signal, applying a second phase shift of $\pi+\theta$ to the scaled second predetermined signal and obtaining a measurement of the received power at the first probe antenna port; and
  determining whether the measurement of the received power obtained when applying the first phase shift is less than the received power obtained when applying the second phase shift, and if so, deciding that the sign of the relative phase $\theta$ is positive, and if not, deciding that the sign of the relative phase $\theta$ is negative.

12. A method for performing a non-cable-conducted, over-the-air (OTA) radiated test of a device under test (DUT) in a test system operating in a multiple-input multiple-output (MIMO) environment, the method comprising:
  locating a DUT in an anechoic chamber, the DUT having a plurality of antenna elements electrically coupled to respective antenna ports of the DUT, the chamber having a plurality of probe antennas disposed therein;
  during a calibration mode of operations, causing predetermined signals to be transmitted over a transmission channel comprising a non-cable-conducted, over-the-air (OTA) interface between the probe antennas of the chamber and the antenna ports of the DUT and obtaining measurements of received power and relative phase for the predetermined signals;
  using the measurements obtained during the calibration mode of operations to construct a radiation channel matrix associated with the transmission channel;
  obtaining an inverse matrix of the radiation channel matrix; and
  during a test mode of operations, performing a non-cable-conducted, OTA radiated test that applies the inverse matrix to DUT performance measurements obtained by the test instrument to calibrate out the radiation channel matrix from the DUT performance measurements.

13. The method of claim 12, further comprising:
  with the test instrument, causing a switching device of the test system to select a configuration of the probe antennas to provide predetermined characteristic for the transmission channel, wherein the selected configuration that is used during the calibration mode of operations is also used during the test mode of operation.

14. The method of claim 13, wherein the DUT has at least a first receiver and at least first and second antenna ports, and wherein the test system has at least first and second probe antennas, said at least first and second probe antennas corresponding to a configuration of probe antennas selected by the test instrument, wherein the test instrument obtains values to construct the radiation channel matrix by:
- with a second transmission channel connected to the second probe antenna turned off and a first transmission channel connected to the first probe antenna turned on, causing a first predetermined signal to be transmitted by the first probe antenna and receiving a report from the DUT of measurements of received power of the first predetermined signal at the first and second antenna ports and of relative phase between the first predetermined signal received at the first antenna port and the first predetermined signal received at the second antenna port;
- with the first transmission channel connected to the first probe antenna turned off and the second transmission channel connected to the second probe antenna turned on, causing a second predetermined signal to be transmitted by the second probe antenna port and receiving a report from the DUT of measurements of received power of the second predetermined signal at the first and second antenna ports and of relative phase between the second predetermined signal received at the first antenna port and the second predetermined signal received at the second antenna port;
- with a second transmission channel connected to the second probe antenna turned off and the first transmission channel connected to the first probe antenna turned on, causing a first predetermined signal to be transmitted by the first probe antenna and receiving a report from the DUT of a measurement of received power, $h_{1,1}$, at the first antenna port of the DUT;
- with the first transmission channel turned off and the second transmission channel turned on, causing a second predetermined signal to be transmitted by the second probe antenna and receiving a report from the DUT of a measurement of received power, $h_{1,2}$, at the first antenna port of the DUT;
- with the first and second transmission channels turned on, causing the first and second predetermined signals to be transmitted by the first and second probe antennas, respectively, and receiving a report from the DUT of a measurement of received power, $h_3 = h_{1,1} + h_{1,2}$, at the first antenna port of the DUT;
- using the measurements of received power, $h_{1,1}$, $h_{1,2}$ and $h_3$ to determine a relative phase, $\theta$, between the first and second predetermined signals transmitted by the first and second probe antennas, respectively; and
- using the obtained measurements of received power and relative phase and the determined relative phase, $\theta$, to construct the radiation channel matrix.

15. The method of claim 14, wherein the test instrument determines a sign of the relative phase, $\theta$, by:
- dividing the measured received power $h_{1,1}$ by the measured received power $h_{1,2}$ to obtain a ratio, $\alpha$;
- with the second transmission channel turned on and the first transmission channel turned off, measuring the received power at the first antenna port while adjusting a power of the second transmission channel to scale an amplitude of the second predetermined signal being transmitted by the second probe antenna by $\alpha$;
- with the first and second transmission channels turned on such that the first probe antenna is transmitting said first predetermined signal and the second probe antenna is transmitting the scaled second predetermined signal, applying a first phase shift of $\pi - \theta$ to the scaled second predetermined signal and obtaining a measurement of the received power at the first antenna port from the DUT;
- with the first and second transmission channels turned on such that the first probe antenna is transmitting said first predetermined signal and the second probe antenna is transmitting the scaled second predetermined signal, applying a second phase shift of $\pi + \theta$ to the scaled second predetermined signal and obtaining a measurement of the received power at the first antenna port from the DUT; and
- determining whether the measurement of the received power obtained when applying the first phase shift is less than the received power obtained when applying the second phase shift, and if so, deciding that the sign of the relative phase $\theta$ is positive, and if not, deciding that the sign of the relative phase $\theta$ is negative.

16. The method of claim 13, wherein the DUT has at least a first transmitter and at least first and second antenna ports, and wherein the test system has at least first and second probe antennas, said at least first and second probe antennas corresponding to a configuration of the probe antennas selected by the test instrument, wherein the test instrument obtains values to construct the radiation channel matrix by:
- with a second transmission channel connected to the second antenna port turned off and a first transmission channel connected to the first antenna port turned on, causing a first predetermined signal to be transmitted by the first antenna port and obtaining measurements of received power of the first predetermined signal at the first and second probe antennas and of relative phase between the first predetermined signal received at the first probe antenna and the first predetermined signal received at the second probe antenna;
- with the first transmission channel connected to the first antenna port turned off and the second transmission channel connected to the second antenna port turned on, causing a second predetermined signal to be transmitted by the second antenna port and obtaining measurements of received power of the second predetermined signal at the first and second probe antennas and of relative phase between the second predetermined signal received at the first probe antenna and the second predetermined signal received at the second probe antenna;
- with the second transmission channel connected to the second antenna port turned off and the first transmission channel connected to the first antenna port turned on, causing the first predetermined signal to be transmitted by the first antenna port and obtaining a measurement of received power, $h_{1,1}$, at the first probe antenna;
- with the first transmission channel turned off and the second transmission channel turned on, causing the second predetermined signal to be transmitted by the second antenna port and obtaining a measurement of received power, $h_{1,2}$, at the first probe antenna port; and
- with the first and second transmission channels turned on, causing the first and second predetermined signals to be transmitted by the first and second antenna ports, respectively, and obtaining a measurement of received power, $h_3 = h_{1,1} + h_{1,2}$, at the first probe antenna;
- using the measurements of received power, $h_{1,1}$, $h_{1,2}$ and $h_3$ to determine a relative phase, $\theta$, between the first and second predetermined signals transmitted by the first and second antenna ports, respectively; and using the obtained measurements of received power and relative phase and determined relative phase, θ, to construct the radiation channel matrix.

17. The method of claim 16, wherein the test instrument determines a sign of the relative phase, θ, by:

dividing the measured received power $h_{1,1}$ by the measured received power $h_{1,2}$ to obtain a ratio, α;

with the second transmission channel turned on and the first transmission channel turned off, measuring the received power at the first probe antenna while adjusting a power of the second transmission channel to scale an amplitude of the second predetermined signal being transmitted by the second antenna port by α;

with the first and second transmission channels turned on such that the first antenna port is transmitting said first predetermined signal and the second antenna port is transmitting the scaled second predetermined signal, applying a first phase shift of π−θ to the scaled second predetermined signal and obtaining a measurement of the received power at the first probe antenna;

with the first and second transmission channels turned on such that the first antenna port is transmitting said first predetermined signal and the second antenna port is transmitting the scaled second predetermined signal, applying a second phase shift of π+θ to the scaled second predetermined signal and obtaining a measurement of the received power at the first probe antenna port; and determining whether the measurement of the received power obtained when applying the first phase shift is less than the received power obtained when applying the second phase shift, and if so, deciding that the sign of the relative phase θ is positive, and if not, deciding that the sign of the relative phase θ is negative.

18. A computer program comprising computer code for execution by a test instrument of a test system operating in a multiple-input multiple-output (MIMO) environment for performing a non-cable-conducted, over-the-air (OTA) radiated test, the computer code being embodied on a non-transitory computer-readable medium, the computer code comprising:

a first code portion that causes predetermined signals to be transmitted over a transmission channel comprising a non-cable-conducted, over-the-air (OTA) interface between probe antennas disposed in a anechoic chamber and antenna ports of a device under test (DUT) and obtaining measurements of received power and relative phase for the predetermined signals;

a second code portion that uses the measurements obtained by the first code portion to construct a radiation channel matrix associated with the transmission channel;

a third code portion that obtains an inverse matrix of the radiation channel matrix; and a fourth code portion that applies the inverse matrix to DUT performance measurements obtained by the test instrument while performing a non-cable-conducted, OTA radiated test to calibrate out the radiation channel matrix from the DUT performance measurements.

19. The computer program of claim 18, wherein the DUT has at least a first receiver and at least first and second antenna ports, and wherein the test system has at least first and second probe antennas, said at least first and second probe antennas corresponding to a configuration of probe antennas selected by a switching device of the test instrument, wherein the first code portion obtains the measurements of received power and relative phase by:

with a second transmission channel connected to the second probe antenna turned off and a first transmission channel connected to the first probe antenna turned on, causing a first predetermined signal to be transmitted by the first probe antenna and receiving a report from the DUT of measurements of received power of the first predetermined signal at the first and second antenna ports and of relative phase between the first predetermined signal received at the first antenna port and the first predetermined signal received at the second antenna port;

with the first transmission channel connected to the first probe antenna turned off and the second transmission channel connected to the second probe antenna turned on, causing a second predetermined signal to be transmitted by the second probe antenna port and receiving a report from the DUT of measurements of received power of the second predetermined signal at the first and second antenna ports and of relative phase between the second predetermined signal received at the first antenna port and the second predetermined signal received at the second antenna port;

with a second transmission channel connected to the second probe antenna turned off and the first transmission channel connected to the first probe antenna turned on, causing a first predetermined signal to be transmitted by the first probe antenna and receiving a report from the DUT of a measurement of received power, $h_{1,1}$, at the first antenna port of the DUT;

with the first transmission channel turned off and the second transmission channel turned on, causing a second predetermined signal to be transmitted by the second probe antenna and receiving a report from the DUT of a measurement of received power, $h_{1,2}$, at the first antenna port of the DUT;

with the first and second transmission channels turned on, causing the first and second predetermined signals to be transmitted by the first and second probe antennas, respectively, and receiving a report from the DUT of a measurement of received power, $h_3 = h_{1,1} + h_{1,2}$, at the first antenna port of the DUT;

using the measurements of received power, $h_{1,1}$, $h_{1,2}$ and $h_3$ to determine a relative phase, θ, between the first and second predetermined signals transmitted by the first and second probe antennas, respectively; and using the measurements of received power and relative phase obtained and the determined relative phase, θ, to construct the radiation channel matrix.

20. The computer program of claim 18, wherein the DUT has at least a first transmitter and at least first and second antenna ports, and wherein the test system has at least first and second probe antennas, said at least first and second probe antennas corresponding to a configuration of probe antennas selected by a switching device of the test instrument, wherein the first code portion obtains the measurements of received power and relative phase by:

with a second transmission channel connected to the second antenna port turned off and a first transmission channel connected to the first antenna port turned on, causing a first predetermined signal to be transmitted by the first antenna port and obtaining measurements of received power of the first predetermined signal at the first and second probe antennas and of relative phase between the first predetermined signal received at the first probe antenna and the first predetermined signal received at the second probe antenna;

with the first transmission channel connected to the first antenna port turned off and the second transmission channel connected to the second antenna port turned on, causing a second predetermined signal to be transmitted by the second antenna port and obtaining measurements of received power of the second predetermined signal at the first and second probe antennas and of relative phase between the second predetermined signal received at the first probe antenna and the second predetermined signal received at the second probe antenna;

with the second transmission channel connected to the second antenna port turned off and the first transmission channel connected to the first antenna port turned on, causing the first predetermined signal to be transmitted by the first antenna port and obtaining a measurement of received power, $h_{1,1}$, at the first probe antenna;

with the first transmission channel turned off and the second transmission channel turned on, causing the second predetermined signal to be transmitted by the second antenna port and obtaining a measurement of received power, $h_{1,2}$, at the first probe antenna port; and with the first and second transmission channels turned on, causing the first and second predetermined signals to be transmitted by the first and second antenna ports, respectively, and obtaining a measurement of received power, $h_3 = h_{1,1} + h_{1,2}$, at the first probe antenna;

using the measurements of received power, $h_{1,1}$, $h_{1,2}$ and $h_3$ to determine a relative phase, $\theta$, between the first and second predetermined signals transmitted by the first and second antenna ports, respectively; and using the measurements of received power and relative phase and the determined relative phase, $\theta$, to construct the radiation channel matrix.

\* \* \* \* \*